United States Patent [19]
Grossi

[11] Patent Number: 5,862,740
[45] Date of Patent: Jan. 26, 1999

[54] DEVICE FOR FROTHING AND HEATING LIQUIDS, SUCH AS MILK AND THE LIKE, PROVIDED WITH LONGITUDINAL CHANNELS FOR SUCTION OF THE LIQUID-FROTHING AIR

[75] Inventor: Lucio Grossi, Bergamo, Italy

[73] Assignee: IDEA S.R.l., Dalmine, Italy

[21] Appl. No.: 876,183

[22] Filed: Jun. 12, 1997

[30] Foreign Application Priority Data

Jun. 21, 1996 [IT] Italy .................................. MI960455 U

[51] Int. Cl.$^6$ .................................. A47J 43/12; A47J 31/46
[52] U.S. Cl. .................................. 99/293; 99/323.1; 261/DIG. 16; 261/DIG. 76; 366/101
[58] Field of Search .............................. 99/293, 279, 290, 99/300, 294, 323.1; 261/DIG. 16, DIG. 76, 121.1, 78.1; 366/101, 163.1, 163.2, 167.1, 191

[56] References Cited

U.S. PATENT DOCUMENTS 4,960,042 10/1990 Grossi ........................................ 99/293
5,738,002 4/1998 Marano-Ducarne ....................... 99/293

*Primary Examiner*—Reginald L. Alexander
*Attorney, Agent, or Firm*—Herbert Dubno

[57] ABSTRACT

Device for frothing and heating liquids such as milk (3) and the like, comprising a substantially cylindrical intermediate body (10) which has sealingly engaged on it an upper body (20) connected to the steam supply pipe (22a) of a machine for preparing hot drinks and provided at the bottom with a nozzle (23), the nozzle (23) being arranged above an internal constriction (10b) which is followed by a coaxial cylindrical duct (12d) in which there emerge radial holes (12a) supplying air for frothing the milk (3), wherein the intermediate body (10) has fixed to it at the bottom a cylindrical body (30) onto which there is coaxially fitted a tubular element (40), wherein said cylindrical body (30) has projections (31) extending longitudinally from its external surface and designed to be engaged with corresponding seats (41) of the tubular element (40) in order to retain the latter, and wherein the tubular element (40) has recesses (51) extending longitudinally and forming longitudinal ducts supplying the frothing air.

5 Claims, 1 Drawing Sheet

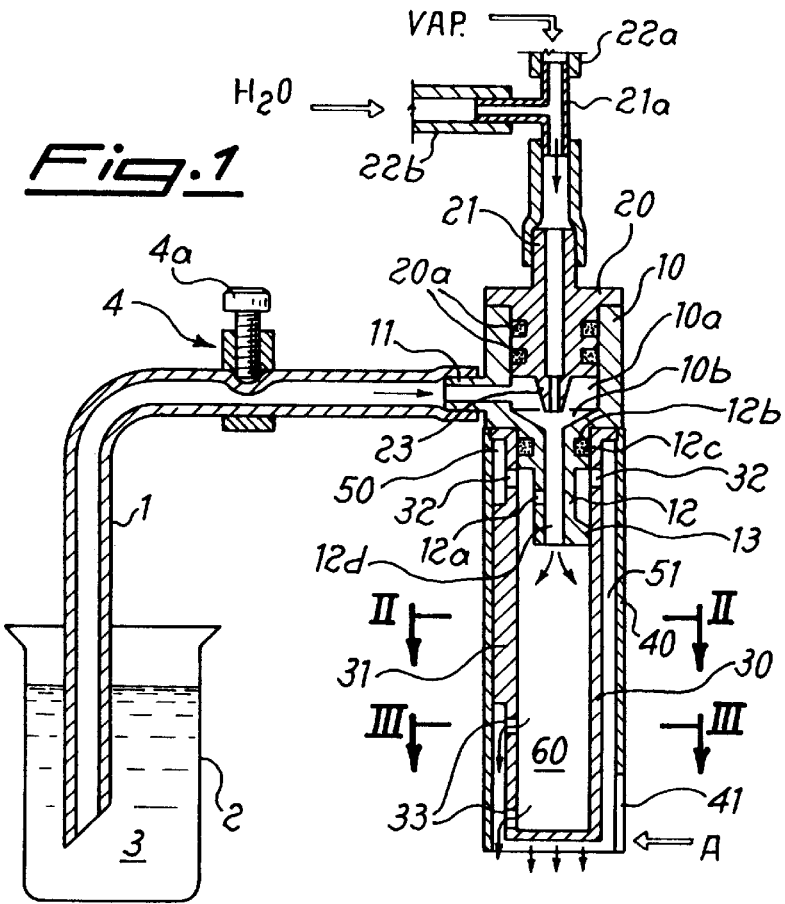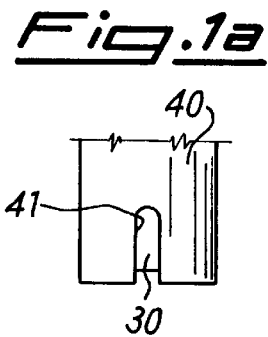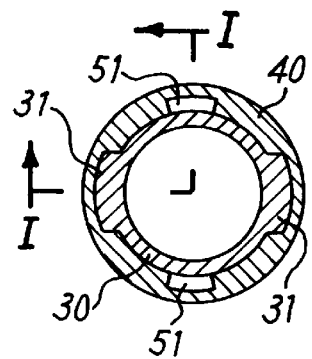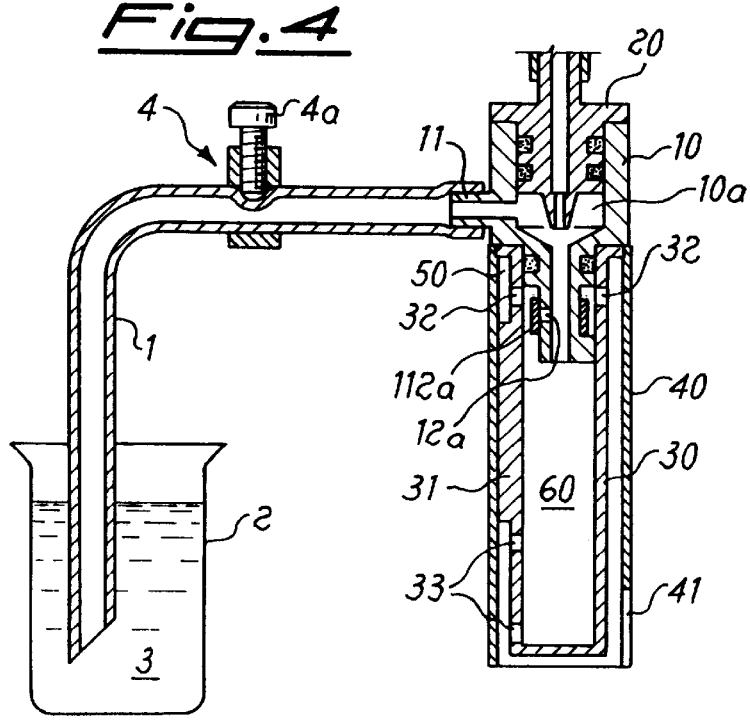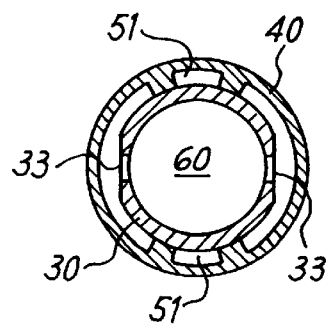

DEVICE FOR FROTHING AND HEATING LIQUIDS, SUCH AS MILK AND THE LIKE, PROVIDED WITH LONGITUDINAL CHANNELS FOR SUCTION OF THE LIQUID-FROTHING AIR

BACKGROUND OF INVENTION

The present invention relates to a device for frothing and heating liquids, such as milk and the like, in particular for automatic machines, which is provided with longitudinal channels for suction of the liquid-frothing air.

In order to make milk-based hot drinks, such as cappuccino and the like, use is made of steam-producing machines, by means of which the milk necessary for preparation of the drink is heated and frothed with air, so as to obtain a surface foam which is quite liked by consumers.

For this purpose the machines of the known type comprise automatically operating steam heating and frothing devices provided with mixing chambers which have a complex configuration and narrow flow cross-sections and are also equipped with members for micrometric adjustment of the cross-sections themselves, which are difficult to manufacture and difficult to clean as well as being subject, during use, to the formation of milk deposits which alter the values of the preselected cross-sections, resulting in irregular operation of the assembly.

In addition to these types of devices, a device for frothing and heating milk for drinks is also known from EP 0,344,859 in the name of the present Applicant, said device comprising a substantially tubular cylindrical body connected to the steam-emitting pipe of a machine for preparing hot drinks, which cylindrical body has inside it a first nozzle, outside of which there is defined, inside the cylindrical body, a chamber in which there emerges a duct for the suction of milk from a container, the said nozzle being located above a constriction extended downwards until it emerges in an extension of the said cylindrical body forming a second nozzle outside of which, inside the cylindrical body, there is defined an annular chamber provided with one or more radial openings communicating with the exterior and an axial passage which places in communication the chamber with the bottom part of the cylindrical body, the second nozzle being placed in communication with the chamber by means of radial holes, through which the frothing air is sucked.

These devices of the known type have the drawback, however, arising from the fact that, in the case of liquids to be frothed such as milk and the like which have a high density and contain a high percentage of fatty substances, the holes for drawing air from the outside, which are formed radially in the vicinity of the frothing chamber, tend to get blocked up by the milk which tends to bubble out owing to the effect of the pressures existing inside the frothing chamber; in fact, said milk which comes into contact with the air intake hole leaves fatty deposits on the hole itself which tends to become blocked, gradually reducing the quantity of air sucked in until the desired frothing action no longer occurs.

In addition, as a result of these outflows of milk, it is necessary to perform frequent cleaning operations both in order to unblock the suction hole and so as to avoid stagnation of fatty substances on the outside of the frothing device, which stagnation may give rise to unhygienic fermentation phenomena.

The technical problem which is posed, therefore, is that of providing a device for frothing and heating liquids such as milk and the like, which is provided with means for suction of the air from the outside designed not to come into contact with the liquid to be frothed, thus making it possible to maintain unaltered, over time, the quantity of air sucked in for frothing and avoid the troublesome external outflow of liquid from said suction channels.

Within the scope of this technical problem a further necessity is that the device should be formed by a reduced number of parts which can be easily assembled and which have a low cost and can be easily washed internally without the need for disassembly thereof.

SUMMARY OF INVENTION

These results are obtained by the present invention which provides a device for frothing and heating liquids such as milk and the like, comprising a substantially cylindrical intermediate body which has sealingly engaged on it an upper body connected to the steam supply pipe of a machine for preparing hot drinks and provided at the bottom with a nozzle, arranged above an internal constriction of said intermediate body, which constriction is followed by a coaxial cylindrical duct in which there emerge radial holes supplying air for frothing the milk, wherein said intermediate body has fixed to it at the bottom a cylindrical body onto which there is coaxially fitted a tubular element, wherein said bottom cylindrical body has projections extending longitudinally on its external surface and designed to be engaged with corresponding seats of the tubular element in order to retain the latter, and wherein said tubular element has recesses extending longitudinally and forming longitudinal ducts supplying the air to the liquid frothing chamber.

Further details may be obtained from the following description, with reference to the accompanying drawings, in which:

BRIEF DESCRIPTION OF DRAWINGS

FIG. 1: shows a cross-sectional view, along the plane I—I of FIG. 2, of the frothing device according to the invention associated with a milk container;

FIG. 1a: shows a view, in the direction of the arrow "AA" of FIG. 1, of the bottom end section of the device according to FIG. 1;

FIG. 2: shows a cross-section along the plane indicated by II—II in FIG. 1;

FIG. 3: shows a cross-section along the plane indicated by III—III in FIG. 1; and FIG. 4: shows a longitudinal cross-section through a variation of embodiment of the device according to FIG. 1.

DETAILED DESCRIPTION OF PREFERRED EMBODIMENT

As shown in the Figures, the frothing device according to the invention comprises an intermediate body 10 onto which there is engaged an upper body 20 and a lower body 30 onto which an additional tubular element 40 is coaxially mounted.

Said intermediate body 10 has a substantially cylindrical shape and is provided with a radial connector 11 for engaging one end of a flexible pipe 1, the other end of which is immersed in the container 2 containing the liquid, for example milk 3 to be heated and frothed.

The pipe 1, moreover, has arranged on it an element 4 for adjusting the cross-section of the pipe itself, which is provided with a screw 4a by means of which it is possible to adjust the internal aperture of the pipe and hence the quantity of milk 3 to be sucked in, as will emerge more clearly below.

The bottom part 12 of the said body 10 has a cylindrical shape with a diameter smaller than the top part and with a free end formed in the manner of an annular edge 13 cut longitudinally on one side; said bottom section 12, moreover, has formed in it a radial hole 12a as well as a seat 12b for an annular sealing element 12c.

The body 10 is internally hollow and has an upper substantially funnel-shaped part with a cylindrical upper part 10a and a lower constriction 10b, while the internal part corresponding to the bottom section 12 is formed as a cylindrical duct 12d.

The hollow part 10a of the intermediate body 10 has inserted inside it said upper body 20 friction-engaged by means of annular sealing elements 20a.

The upper body 20 has a coaxial connector 21 onto which there are engaged, by means of a "T" connection piece 21a, the pipe 22a supplying the steam and the pipe 22b supplying water for internal cleaning of the device.

The bottom part of the body 20 has a nozzle 23 coaxial with the cylindrical duct 12d of the body 10 which is arranged in the chamber 10a at a location corresponding to both the internal constriction 10b and the connector 11 for suction of the milk 3.

The intermediate body 10 has fitted to it at the bottom a cylindrical body 30 which has on its external surface two reliefs 31 extending in the longitudinal direction and shaped substantially in the form of a dovetail for engagement with corresponding seats 41 of the said tubular element 40 coaxially sliding on the said cylindrical body 30.

Said cylindrical body 30 has two radial holes 32 in the upper part and at least two other radial holes 33 in the lower part; as will emerge more clearly below, while the upper holes serve to suck in the frothing air, the lower holes serve to deliver the drink.

As illustrated in the view shown in FIG. 1a, the tubular element 40 has a bottom end provided with longitudinal eyelets 41 for favouring suction of the air.

Once the four bodies 10, 20, 30 and 40 have been coaxially assembled, the device has a first chamber 10a where mixing of the steam from the pipe 22a and the milk sucked in by 1 is performed; an underlying annular chamber 50 for introducing the frothing air supplied from the longitudinal ducts 51 and sucked inside the coaxial duct 12d from the holes 32 and 12a.

With this configuration, the steam, supplied by the pipe 2, is accelerated inside the nozzle 23 of the upper body 30 and produces inside the underlying constriction 10b a vacuum which causes suction into the chamber 10a, surrounding the nozzle 23, of the milk 3 to be frothed, supplied by the pipe 1.

The sucked-in milk, accelerated inside the steam duct 12d, produces in turn a vacuum such as to suck in, through the hole 12a, external air which comes from the annular chamber 50 and is supplied to the latter by the longitudinal duct 51 and which flows into the duct 12d through the holes 32 and is diffused in the milk, forming the desired froth.

The holes 32 and 12d have a fairly large aperture and their diameter is not critical; advantageously they are arranged diametrically opposite so as to avoid, at start-up or stoppage, possible spray passing through them.

The milk and the froth thus formed therefore emerge inside the chamber 60 of the cylindrical body 30 and from here pass to the outside through the passages 33, therefore being slowed down and homogeneously distributed.

The dimensions of the nozzle 23, the constriction 10a and the holes 32, 12d are such that they provide a ratio of milk and air, suitable for forming the desired froth; by adjusting the screw 4a of the constriction device 4 it is also possible to modify the quantity of milk sucked in by the steam, thus varying the temperature thereof.

As illustrated in FIG. 4, the device according to the invention may also operate solely so as to heat the milk, without the formation of froth; in this case, it is sufficient to fit onto the cylindrical body 30 an annular seal 112a in order to block up the hole 12a which, no longer allowing air to pass inside the duct 12d, does not allow formation of the froth, and the milk delivered externally is heated only by the steam coming from the duct 22.

From FIG. 1 it can be seen also how by intercepting, via known means not illustrated, the steam pipe 22a, upstream of the "T" connection piece, and supplying instead water through the duct 22b it is possible to obtain easy and thorough internal cleaning of the frothing device according to the invention.

Many variations may be introduced as regards the realization of the parts which make up the invention, without thereby departing from the protective scope of the present invention, as defined by the claims which follow.

I claim:

1. Device for frothing and heating liquids such as milk (3) and the like, comprising a substantially cylindrical intermediate body (10) which has sealingly engaged on it an upper body (20) connected to the steam supply pipe (22a) of a machine for preparing hot drinks and provided at the bottom with a nozzle (23), outside which nozzle there is defined, inside the said intermediate body (10), a chamber (10a) in which a duct (11, 1) for suction of the milk (3) from a container (2) emerges, said nozzle (23) being arranged above a constriction (10b) of the chamber (10a), which constriction is followed by a coaxial cylindrical duct (12d) into which there emerge radial holes (12a) introducing the air for frothing the liquid (3), wherein said intermediate body (10) has fitted to it at the bottom an internally hollow cylindrical body (30) on the side surface of which radial holes (32) are formed and onto which there is coaxially fitted a tubular element (40), characterized in that said cylindrical body (30) has projections (31) extending longitudinally on its external surface and designed to be engaged with corresponding seats (41) of the tubular element (40) in order to retain the latter, and in that said tubular element (40) has recesses (51) extending longitudinally and forming longitudinal ducts supplying the frothing air to the said holes for entry into said cylindrical chamber (12d) of the intermediate body (10).

2. Device according to claim 1, characterized in that said external tubular element (40) has eyelets (41) at its bottom end for favouring the introduction of the frothing air.

3. Device according to claim 1, characterized in that said eyelets are elongated in the longitudinal direction.

4. Device according to claim 1, characterized in that said cylindrical body (30) has fitted to it an annular sealing element (112a) for blocking up the holes (12a) for entry of the frothing air into the cylindrical duct (12d), thus causing heating only of the milk, but not the formation of froth.

5. Device according to claim 1, characterized in that said upper cylindrical body (40) may have associated with it means (21a) for connecting to different supply sources (22a, 22b) in order to supply to the device steam for heating the liquid or water for internal washing of the device itself.

* * * * *